United States Patent [19]

Hahn et al.

[11] Patent Number: 4,841,539
[45] Date of Patent: Jun. 20, 1989

[54] GAS LASER DISCHARGE TUBE WITH CERAMIC WAFERS AND COOLING WAFERS IN A STACK

[75] Inventors: Guenther Hahn, Hoehenkirchen; Hans Krueger; Herbert Lamprecht, both of Munich; Werner Seiffarth, Bad Aibling, all of Fed. Rep. of Germany

[73] Assignee: Siemens Aktiengesellschaft, Berlin and Munich, Fed. Rep. of Germany

[21] Appl. No.: 37,202

[22] Filed: Apr. 10, 1987

[30] Foreign Application Priority Data

May 2, 1986 [DE] Fed. Rep. of Germany ....... 3614912

[51] Int. Cl.⁴ ................................................. H01S 3/03
[52] U.S. Cl. ........................................ 372/63; 372/34; 372/61; 372/62
[58] Field of Search ................................. 372/61–63, 372/34

[56] References Cited

U.S. PATENT DOCUMENTS

| 3,753,144 | 8/1973 | Kearns et al. | 372/62 |
| 4,266,200 | 5/1981 | Liu et al. | 372/61 |
| 4,380,077 | 4/1983 | McMahan | 372/62 |
| 4,698,818 | 10/1987 | Heynisch et al. | 372/61 |

FOREIGN PATENT DOCUMENTS

| 0163169 | 12/1985 | European Pat. Off. | 372/61 |
| 0065485 | 5/1980 | Japan | 372/62 |

Primary Examiner—William L. Sikes
Assistant Examiner—B. R. R. Holloway

[57] ABSTRACT

A relatively high power gas laser includes a laser discharge tube formed of stacked alternating cooling wafers and ceramic wafers, the cooling wafers being provided with recesses set back from the discharge channel of the laser discharge tube.

16 Claims, 1 Drawing Sheet

GAS LASER DISCHARGE TUBE WITH CERAMIC WAFERS AND COOLING WAFERS IN A STACK

BACKGROUND OF THE INVENTION

1. Field of the Invention

The present invention relates generally to a discharge tube for use in a gas laser.

2. Description of the Related Art

A gas laser is disclosed in U.S. Pat. No. 3,753,144 in which, in one embodiment, a discharge tube is formed of sections of metal, such as copper, secured to cooling plates and spaced from neighboring tube sections. In the disclosed laser, the laser beam, or emission, causes sputtering of the copper from the tube sections which leads to the formation of a metal precipitate on a ceramic outer tube of the laser. The metal precipitation on the outer tube deteriorates the insulation value thereof and is a possible source of electric arcs.

SUMMARY OF THE INVENTION

An object of the present invention is to provide a gas laser discharge tube formed of a stacked structure, the gas laser being capable of producing output powers in the milliwatt range without sputtering away metal from cooling plates. The gas laser of the invention is relatively inexpensive, and also has a low structural height.

This and other objects are achieved in a discharge tube for a gas laser having alternate ceramic wafers and cooling wafers. The cooling wafers are generally of copper, although other heat conductive materials may be used, and are kept out of the actual laser discharge space of the discharge chamber so that the copper is largely prevented from being sputtered as a result of the laser irradiation. A gap is formed between neighboring ceramic wafers by the cooling wafers that are disposed therebetween. The cooling wafers are recessed, or set back, from the edges of the ceramic wafers defining the laser discharge channel. The gap traps any possible sputtered copper and causes it to condense therein at least to a slight degree, thereby providing a shielding effect to prevent sputtered metal from reaching other portions of the laser.

The ceramic wafers of the present discharge tube include at least one gas return channel formed by bores extending through the wafers generally parallel to the axis of the discharge tube. When more than one gas return channel is provided, the bores are generally equally spaced from the discharge channel. The gas return bores of neighboring ceramic wafers are in alignment, or registration, with one another to form a channel through the stack of ceramic wafers through which a gas return flow occurs. To obtain an optimal resistance to thermal stresses in the direction of the axis of symmetry, two or more bores are distributed circumferentially spaced about each one of the ceramic wafers. The cooling wafers are set back from the bores forming the gas return channels, as well. The cooling wafers, in one embodiment, each have one recess, or opening, into which both the discharge channels and the gas return channels defined by the ceramic wafers discharge. Thus, in this embodiment, an especially deep setback of the cooling wafers from the discharge channel is provided so that there is only an extremely slight risk of sputtering of the copper cooling wafers. The interruptions in the discharge channel caused by the setback cooling wafers do not have a significant disturbing effect on the laser beam emission; furthermore, the interruptions in the gas return channels advantageously aid in local pressure equalization.

In another embodiment, the cooling wafers extend relatively close to the discharge channel and the cooling wafers include additional bores interrelated with the bores that form the gas return channels in the ceramic wafers. The additional bores in the cooling wafers at least overlap the bores in the neighboring ceramic wafers.

The ceramic wafers are preferably of a relatively inexpensive and nontoxic $Al_2O_3$ ceramic. When the cooling wafers are set back from the discharge channel preferably by at least twice their thickness, an optimum heat elimination and a reduced tendency for sputtering is provided.

A relatively short, or narrow, structure is provided by the present invention without the risk of re-ignition of the laser discharge occurring in the gas return channels, since in one embodiment the ceramic wafers have first bores aligned with one another to form the discharge channel, yet the further bores which form the gas return channels are offset relative to one another in neighboring ceramic wafers. The further bores overlap the bores of neighboring ceramic wafers sufficiently to provide a gas flow channel, but do not provide a line-of-sight passage through the gas return channel. The bores can be offset relative to one another radially and/or circumferentially. Thus, no laser discharge is possible in the gas return channels.

DESCRIPTION OF THE PREFERRED EMBODIMENTS

Figure 1:
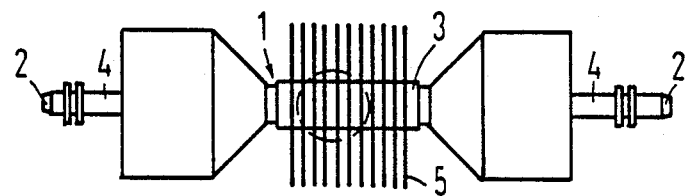
FIG. 1 is a side elevational view of a gas laser including a discharge tube according to the principles of the present invention.

In a gas laser, a laser discharge tube 1 carries laser reflecting mirrors 2 on additional tube sections 4. The laser discharge tube 1 is composed of alternating ceramic wafers 3 and heat conducting cooling wafers or plates 5. The ceramic wafers of the preferred embodiment are composed of $Al_2O_3$ ceramic, which is relatively inexpensive and nontoxic in comparison to BeO ceramic which is frequently utilized in known discharge tubes.

Figure 2:
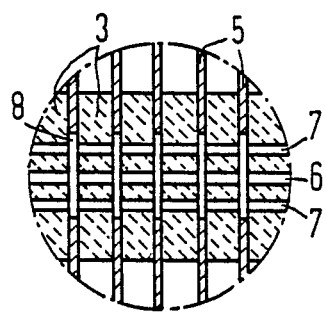
FIG. 2 is an enlarged cross section of a portion of the discharge tube shown in FIG. 1 taken at the region delineated by the broken circle.

With reference to FIG. 2, the ceramic wafers 3 each include mutually aligned bores 6 having a rotational axis coinciding with an axis of symmetry of the ceramic wafers 3. The cooling wafers 5 include bores 8 disposed coaxially relative to the bores 6 in the ceramic wafers 3. The cooling wafers 5 are of a metal having good thermal conductivity, and in one embodiment are of copper. The bores 6 form a discharge channel for the laser beam, while additional bores 7 in the ceramic wafers 3 form gas return channels.

The cooling wafers 5 have a thickness that is relatively small in comparison to the thickness of the ceramic wafers 3 so that the laser beam discharge in the discharge channel is not disturbed by large interruptions in the discharge channel caused by the setback cooling wafers 5. For example, the cooling wafers of one embodiment are about 0.5 mm thick and the ceramic wafers are about 3 mm thick. Cooling wafers having a thickness of up to 0.7 mm may be provided, given a ratio of the thickness of the cooling wafers 5 to the thickness of the ceramic wafers 3 of 1:4. This ratio yields stable discharge tubes 1 having high heat dissipation characteristics.

Figure 3:
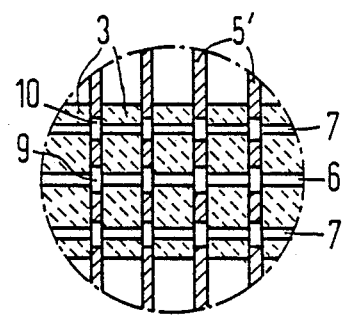
FIG. 3 is an enlarged cross section of a second embodiment of the invention and corresponding to the view of FIG. 2.

In a second embodiment shown in FIG. 3, cooling wafers or plates 5' include bores 9 and 10 which align with the bores 6 and 7, respectively, in the ceramic wafers 3. The bores 9 and 10 in the cooling wafers 5' have diameters that are only slightly larger than that of the corresponding bores 6 and 7 in the ceramic wafers 3. The second embodiment provides an especially efficient heat dissipation. It is preferred that a spacing or set back of at least twice the thickness of the cooling wafers 5' be present between the edges of the bores 6 and the edges of the neighboring bores 9. Such spacing is adequate to prevent any significant sputtering of the copper cooling plate 5', and further enables any copper which may nonetheless be sputtered off to condense largely in the region of the bores 9 between neighboring ceramic wafers 3 without deposition of a metal precipitate within the bores 6 forming the discharge channel.

A compact structure can be provided by the present invention by providing the gas return channels 7 closer to the discharge channel 6 than was previously possible. The proximity of the return channels 7 to the discharge channel ordinarily results in a possible ignition of a laser discharge in the gas return channels. Here, however, the bores 7 defining the gas return channels are offset along the length of the discharge tube 1 so that there is no longer a line-of-sight gas return channel present, thereby eliminating the chance of a laser ignition in the return channels. In the embodiment of FIG. 2, this can be accomplished simply by rotating one or more of the ceramic wafers 3 relative to one another. In FIG. 3, any such rotation must be more carefully performed to maintain a gas flow channel. It is also possible to offset the bores 7 radially from one another to prevent a discharge in the return channels.

The bores 6 and 7 are preferably symmetrically arranged on each ceramic wafer 3 for good thermal stability and strength. This also prevents misalignment of the resonator mirrors 2 during operation.

As used herein, the term "bores" can refer to any opening extending through the cooling wafers 5 and/or ceramic wafers 3.

Although other modifications and changes may be suggested by those skilled in the art, it is the intention of the inventors to embody within the patent warranted hereon all changes and modifications as reasonably and properly come within the scope of their contribution to the art.

We claim as our invention:

1. In a gas laser, a discharge tube, comprising:
a stack of alternating ceramic wafers and cooling wafers, said stack including a discharge channel and at least one return channel,
said ceramic wafers lying radially closer to said discharge channel than said cooling wafers; and
mirrors carried on said discharge tube aligned with said discharge channel for laser light resonance.

2. A gas laser as claimed in claim 1, wherein said cooling wafers consist essentially of copper.

3. A gas laser as claimed in claim 1, wherein said stacked ceramic wafers include axially extending parallel bores forming gas return channels spaced at equal distances from said discharge channel, said gas return bores in neighboring ones of said ceramic wafers providing a channel for gas flow, and
said cooling wafers being set back from said bores in said ceramic wafers.

4. A gas laser as claimed in claim 3, wherein said ceramic wafers each have at least two gas return bores distributed circumferentially, and
said cooling wafers each having a recess encompassing both said discharge channel and said bores in said ceramic wafers forming gas return channels.

5. A gas laser as claimed in claim 1, wherein said ceramic wafers consist essentially of $Al_2O_3$ ceramic.

6. A gas laser as claimed in claim 1, wherein said cooling wafers are set back from said discharge channel by a distance at least twice the thickness of said cooling wafers.

7. A gas laser as claimed in claim 1, wherein said ceramic wafers include mutually aligned first bores forming said discharge channel and second bores offset relative to one another in neighboring ones of said ceramic wafers to form gas return channels.

8. A gas laser as claimed in claim 1, wherein said ceramic wafers have bores forming gas return channels, and
said cooling wafers have bores at least overlapping said bores in neighboring ones of said ceramic wafers.

9. A discharge tube for use in a gas laser, comprising:
a plurality of ceramic wafers each having a first through opening and at least one second through opening;
a plurality of heat-conducting cooling wafers alternately stacked with said plurality of ceramic wafers said plurality of cooling wafers each having at least one through opening in registration with said first through openings of said plurality of ceramic wafers, said at least one through openings in said plurality of cooling wafers being larger than and overlapping said first through openings in said plurality of ceramic wafers;
said first through openings in said plurality of ceramic wafers forming a discharge channel and said second through openings forming a return channel for said gas laser.

10. A discharge tube as claimed in claim 9, wherein said through openings in said cooling wafers encompass said first and at least one second through openings in neighboring ones of said ceramic wafers.

11. A discharge tube as claimed in claim 9, wherein said through openings in said cooling wafers encompass said first through openings in said ceramic wafers, and
said cooling wafers each having second through openings in registration with said second through openings in neighboring ones of said ceramic wafers to form at least one gas return channel in said discharge tube.

12. A discharge tube as claimed in claim 9, wherein said cooling wafers are set back from said discharge channel by at least twice the thickness of each of said cooling wafers.

13. A discharge tube as claimed in claim 9, wherein a ratio of a thickness of said cooling wafers to a thickness of said ceramic wafers is approximately 1:4.

14. A discharge tube as claimed in claim 13, wherein said cooling wafers have a thickness of up to 0.7 mm.

15. A discharge tube as claimed in claim 9, wherein said cooling wafers are approximately 0.5 mm thick and said ceramic wafers are approximately 3 mm thick.

16. A discharge tube as claimed in claim 9, wherein said cooling wafers are set back from said second through openings of neighboring ones of said ceramic wafers.

* * * * *